United States Patent [19]

Wiens

[11] Patent Number: 4,685,898
[45] Date of Patent: Aug. 11, 1987

[54] VARIABLE SPEED TRANSMISSION

[76] Inventor: William S. Wiens, 815 W. Kiowa Dr., Lake Kiowa, Tex. 76240

[21] Appl. No.: 730,058

[22] Filed: May 3, 1985

Related U.S. Application Data

[63] Continuation-in-part of Ser. No. 583,797, Mar. 1, 1984, Pat. No. 4,515,576, and a continuation of Ser. No. 234,436, Feb. 13, 1981, abandoned.

[51] Int. Cl.⁴ ............................................. F16H 7/06
[52] U.S. Cl. ..................................... 474/149; 474/242
[58] Field of Search ....................... 474/242, 149, 159

[56] References Cited

U.S. PATENT DOCUMENTS

| | | | |
|---|---|---|---|
| 1,476,603 | 12/1923 | Firminger | 474/149 X |
| 2,279,134 | 4/1942 | Dalrymple | 474/149 X |
| 4,541,822 | 9/1985 | Stiles | 474/242 X |

*Primary Examiner*—James A. Leppink
*Assistant Examiner*—Thuy M. Bui
*Attorney, Agent, or Firm*—Richards, Harris, Medlock & Andrews

[57] ABSTRACT

An endless chain-belt assembly for engagement around a pulley or tooth sprocket includes an intermediate portion comprising a plurality of center links for engaging the sprocket, the links being connected by transfer of pins. An edge portion defining the opposed edges of the chain-belt assembly as a plurality of edge links defining a surface for engagement with surfaces of the pulley. Structures provided for removably attaching the edge links to the intermediate portion. A tensioning assembly for maintaining tension on the chain-belt assembly includes a first and second tensioning pulley, roller or sprocket for pivotal movement in the plane of rotation of the belt and bias and biasing structure for normally biasing the first idler pulley and the second idler pulley in engagement with the belt.

8 Claims, 23 Drawing Figures

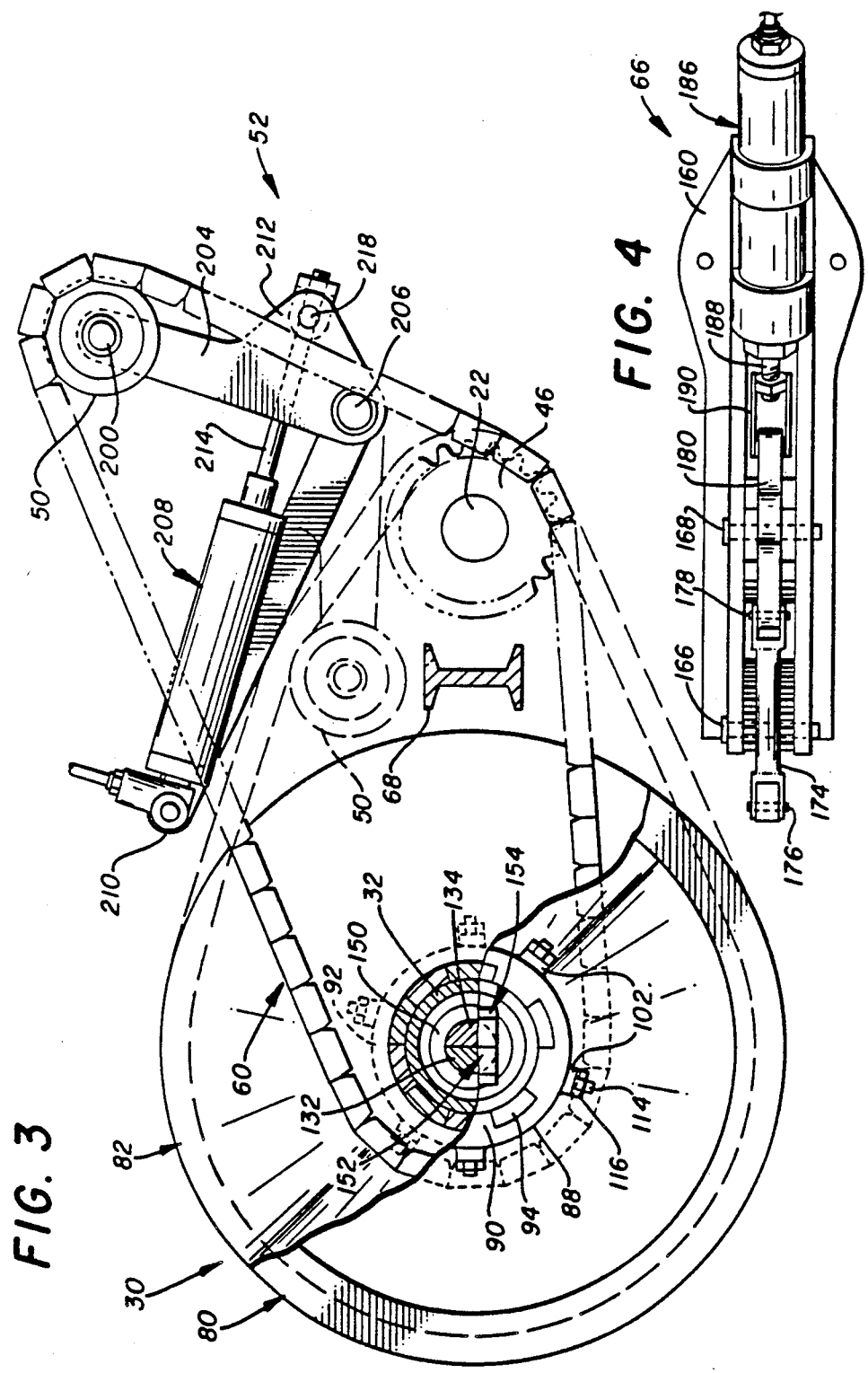

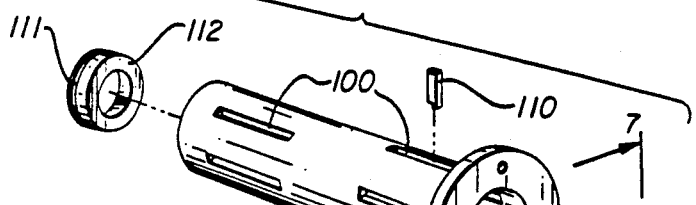
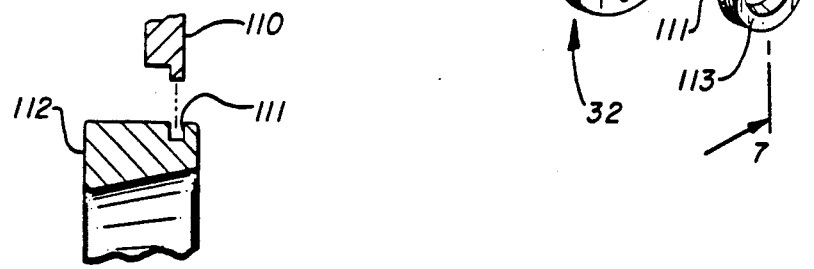
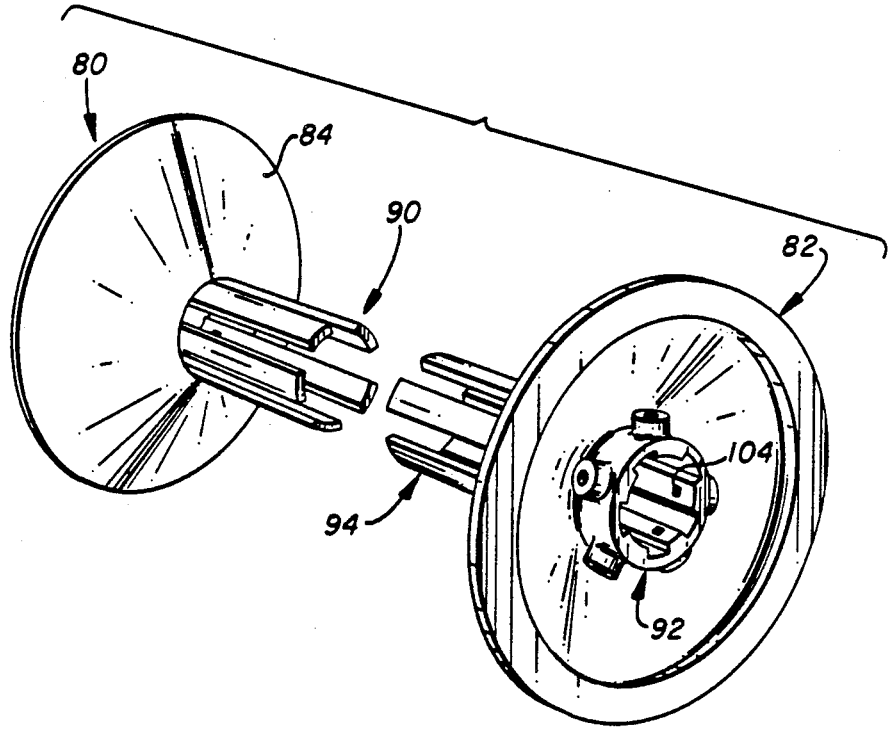

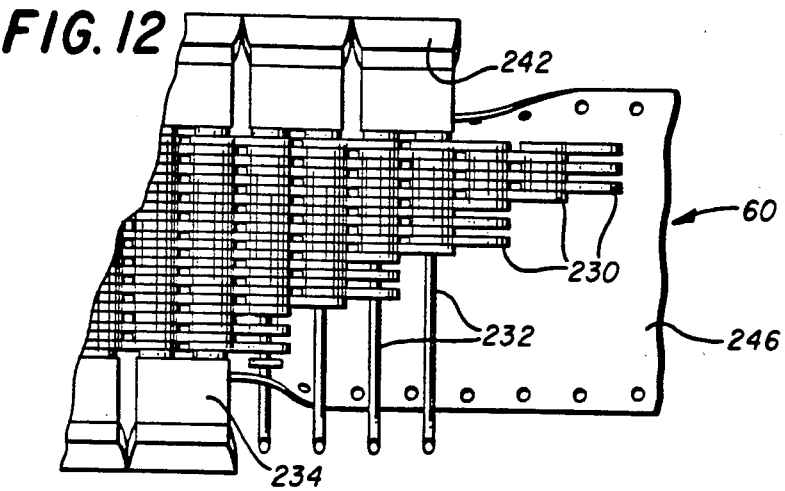
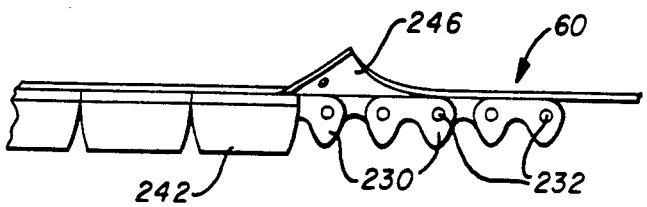
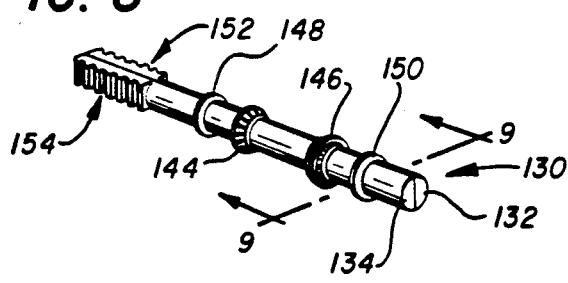
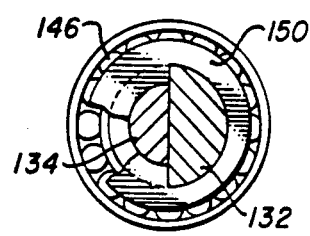
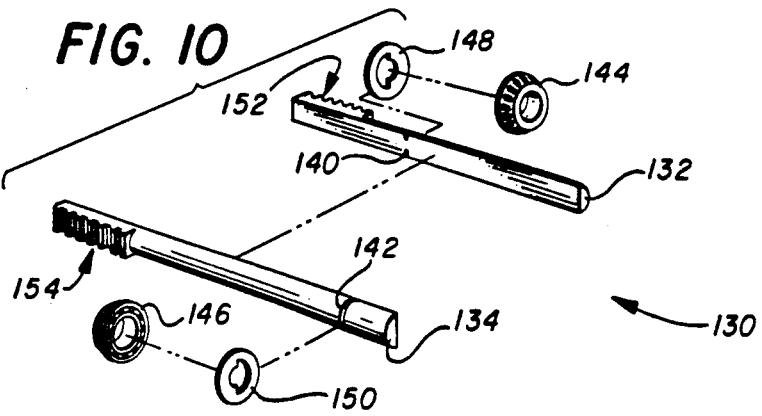

VARIABLE SPEED TRANSMISSION

REFERENCE TO RELATED APPLICATIONS

This Application is a Continuation-in-Part of U.S. application Ser. No. 583,797, filed Mar. 1, 1984 now U.S. Pat. No. 4,515,576, a continuation of Ser. No. 234,436, filed Feb. 13, 1981 and now abandoned. Application Ser. No. 583,797 will issue as U.S. Pat. No. 4,515,576, on May 7, 1985.

BACKGROUND ART

Variable speed transmissions which permit the selection of any drive ratio offer the prospect of better efficiency by permitting a closer match between the most efficient engine speed with a given vehicle speed. Although providing this advantage, prior art transmissions designed to provide a variable ratio range have encountered substantial difficulties in the area of noise, premature wear and power handling limitations. In prior art belt drive variable transmission systems, slippage problems between the belt and the pulleys may be encountered under power. In the prior art units, slippage occurs in low and high gear ratios, thus resulting in wear and loss of efficiency. This is particularly the case where the belt is susceptible to oil contamination. Although metal belts may be used, excessive wear and noise are an undesirable by-product of this substitution.

One prior art system, identified as a belt drive continuously variable transmission produced by Van Doorne Transmissie of Holland, provides variable effective diameter pulleys mounted on a driving and driven shaft. The pulleys have movable pulley halves which separate and close to change their effective diameters for an endless belt encircled for rotation therearound. To vary the "gearing" ratio between the drive and driven shafts from a low to high "gear", the drive pulley closes, forcing the belt to move higher in the effective V-shaped pulley groove. Simultaneously therewith, the driven pulley opens, permitting the belt to ride lower in the pulley groove, thus increasing gearing.

The use of variable effective diameter pulleys in variable speed transmissions is also shown in the transmissions disclosed in U.S. Pat. Nos. 3,214,997 and 2,970,493 to Rieser, 3,287,988 to Heyer and 3,924,480 to Carapellucci. In each of these arrangements, variable effective diameter pulleys are used with a continuous belt for engaging the pulleys in a similar fashion. Generally, the effective diameter of one pulley is increased while the effective diameter of the other is decreased to compensate for belt length. In one embodiment of the transmission disclosed in the reference to Rieser, U.S. Pat. No. 3,214,997, one variable effective diameter pulley is disclosed with belt tension being compensated for by movement of the pulley relative to the fixed diameter pulley.

DISCLOSURE OF THE INVENTION

The present invention provides an improved variable ratio transmission which overcomes many of the disadvantages heretofore experienced by prior art units In accordance with one embodiment of the invention, the variable speed transmission provides a drive sprocket rotatably supported on a first shaft. A variable effective diameter pulley assembly is mounted for rotation with a second shaft. An endless chain-belt assembly, designed for engagement with both the sprocket and variable effective diameter pulley, is encompassed around both to transmit rotation between the first and second shafts.

In accordance with a further embodiment of the invention, the chain-belt assembly used in the present invention has a first portion defining the edges for engagement with the variable effective diameter pulley and a second portion intermediate of the first portion for engaging the sprocket. As a result of this embodiment, positive engagement with the sprocket is provided while permitting transmission of power to the variable effective diameter pulley.

In accordance with a more specific embodiment of the invention, the first portion of the chain-belt assembly includes a plurality of links forming the edge of the belt assembly which define the surface corresponding to opposed inclined belt engaging surfaces on the pulley. A plurality of toothed chain links for engaging the teeth of the sprocket are mounted intermediate of the links on the edge of the chain-belt assembly.

In accordance with still a further embodiment of the invention, the variable effective diameter pulley assembly comprises a pair of pulley halves having opposed inclined belt engaging surfaces with interengaging complimentary splines extending inwardly therefrom. The splines permit the varying of the effective diameter of the pulley asembly as the pulley halves move relative one to the other to change the effective diameter on the pulley assembly engaged by the chain-belt assembly. The interengagment of the pulley splines provide positive support resulting in stabilizing the pulley halves uniformly with one another.

A split shaft assembly, including two half shafts, extends within the pulley halves. Each half shaft engages one of the pulley halves such that as the half shafts of the split shaft assembly are moved relative to one another, the pulley halves are moved one relative to the other. Means is provided for actuating the halves of the split shaft simultaneously such that the center line of the pulley assembly remains fixed as the pulley halves move together or apart.

In accordance with still a further embodiment of the invention, a first bearing is mounted between one split shaft and the first pulley half and a second bearing is mounted between the other split shaft and a second pulley half. A first thrust washer is keyed to one of the halves of the split shaft for engaging the first bearing means and a second thrust washer is keyed to the other of the halves of the split shaft for engaging the second bearing means. Upon movement of the halves of the split shaft, the thrust washers engage the bearing means to move the pulley halves and thereby vary the effective diameter of the pulley.

In accordance with still a further embodiment of the invention, a first rack is attached on the end of one of the halves of the split shaft and a second rack is attached on the end of the other split shaft half. A first control gear is mounted for engagement with the first rack and a second control gear is mounted for engagement with the second rack. A connecting rod is attached between the first and second control gears for simultaneous and opposite movement of the first and second control gears. The halves of the split shaft are translated equally and in opposite directions by movement of the connecting rod thereby effecting equal and opposite movement of the pulley halves.

In accordance with still a further embodiment of the present invention, a hollow driven shaft is received within the splines of the pulley halves and is slidably keyed thereto such that rotation of the pulley is transmitted to the driven shaft. This arrangement permits sliding of the pulley halves relative to the driven shaft by engagement of the split shaft assembly received within the hollow driven shaft.

In accordance with still a further embodiment of the invention, an idler pulley is mounted relative to the variable effective diameter pulley assembly and sprocket with the chain assembly encircled therearound. The idler pulley is moved in conjunction with the opening and closing of the variable diameter pulley assembly to remove slack by tensioning the chain-belt assembly as the effective diameter of the pulley is varied.

The effective diameter of the pulley assembly, and thus the variation of the drive ratio of the present transmission, is operated by a control mechanism for rotating the first and second control gears. By rotating the control gears, the halves of the split shaft are moved to separate or draw together the confronting pulley halves. In low gearing, the pulley halves are drawn together giving the maximum radius of belt travel. Shifting to higher gearing is achieved, in continuous increments as needed, by permitting the separation of the pulley halves and the movement of the chain assembly to a lower periphery on the pulley assembly. Tension on the chain-belt assembly is maintained by the idler pulley which is mounted for movement relative to the chain-belt assembly. In one embodiment of the invention, the idler pulley is mounted on a pivoting arm and is moved either by being spring loaded and/or by the use of a pneumatic cylinder operated to apply a tensioning force to the pivoting arm.

BRIEF DESCRIPTION OF THE DRAWINGS

For a more complete understanding of the present invention, and for further details and advantages thereof, reference is now made to the following description taken in conjunction with the accompanying drawings, in which:

FIG. 3 is a side plan view of the variable transmission of the present invention as seen from along lines 3—3 of FIG. 2;

FIG. 4 is a side view showing the variable pulley control mechanism of the present invention as seen from along line 4—4 of FIG. 2;

FIG. 5 is a perspective exploded view showing the halves of the variable effective diameter pulley used in the present invention;

FIG. 6 is a perspective exploded view showing the driven shaft, the bearing assembly outer race and keys which permit sliding engagement between the bearing race and shaft;

FIG. 7 is a section view taken along line 7—7 of FIG. 6;

FIG. 8 is a perspective view of the split shaft and bearing assembly which control the variable pulley of the present invention;

FIG. 9 is a section view taken along line 9—9 of FIG. 8;

FIG. 10 is an exploded view of the split shaft and bearing assembly illustrated in FIG. 8;

FIG. 12 is a bottom view of the chain-belt assembly used in the present invention partially disassembled to better illustrate the structure thereof;

FIG. 13 is a partially broken away side view of the chain assembly used in the present invention;

DESCRIPTION OF THE PERFERRED EMBODIMENT

Figure 1:
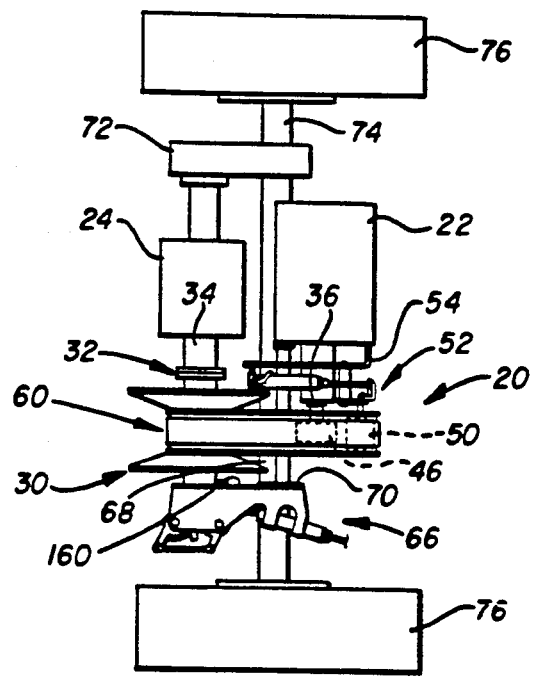
FIG. 1 is a plan view of the transmission of the present invention mounted between an engine and differential of a wheeled vehicle.

FIG. 1 illustrates the variable ratio transmission 20 according to the present invention mounted in relation to an engine 22 and a differential 24. Transmission 20 includes a variable effective diameter pulley assembly 30 rotatably mounted on a hollow shaft 32. Shaft 32 is connected by an appropriate flange to shaft 34 extending from differential 24. A drive shaft 36 extends from engine 22 and includes a drive sprocket 46 mounted on the end thereof. An idler pulley 50 is supported by an idler pulley actuation mechanism 52 from a support 54. An endles chain-belt assembly 60 is encompassed around pulley assembly 30, drive sprocket 46 and idler pulley 50. A pulley control mechanism 66 is attached by a support 68 from support plate 70. As will be described hereinafter in greater detail, control mechanism 66 operates to change the effective diameter of the pulley assembly 30, as ratio change is necessary, while idler pulley 50 is moved by idler pulley actuation mechanism 52 to maintain tension in chain-belt assembly 60.

Referring still to FIG. 1, power from differential 24 is transmitted through an appropriate drive assembly 72 to axle 74 to drive wheels 76. Although the illustration in FIG. 1 illustrates either a front engine-front wheel drive arrangement or a rear engine-rear drive arrangement, it will be understood that the present invention may likewise be used for a front engine-rear wheel drive or rear engine-front wheel drive arrangement by merely incorporating a drive shaft as is well known in the art. Likewise, as will become apparent from the following description of the present invention, other arrangements are made possible by the particular transmission disclosed herein.

Figure 2:
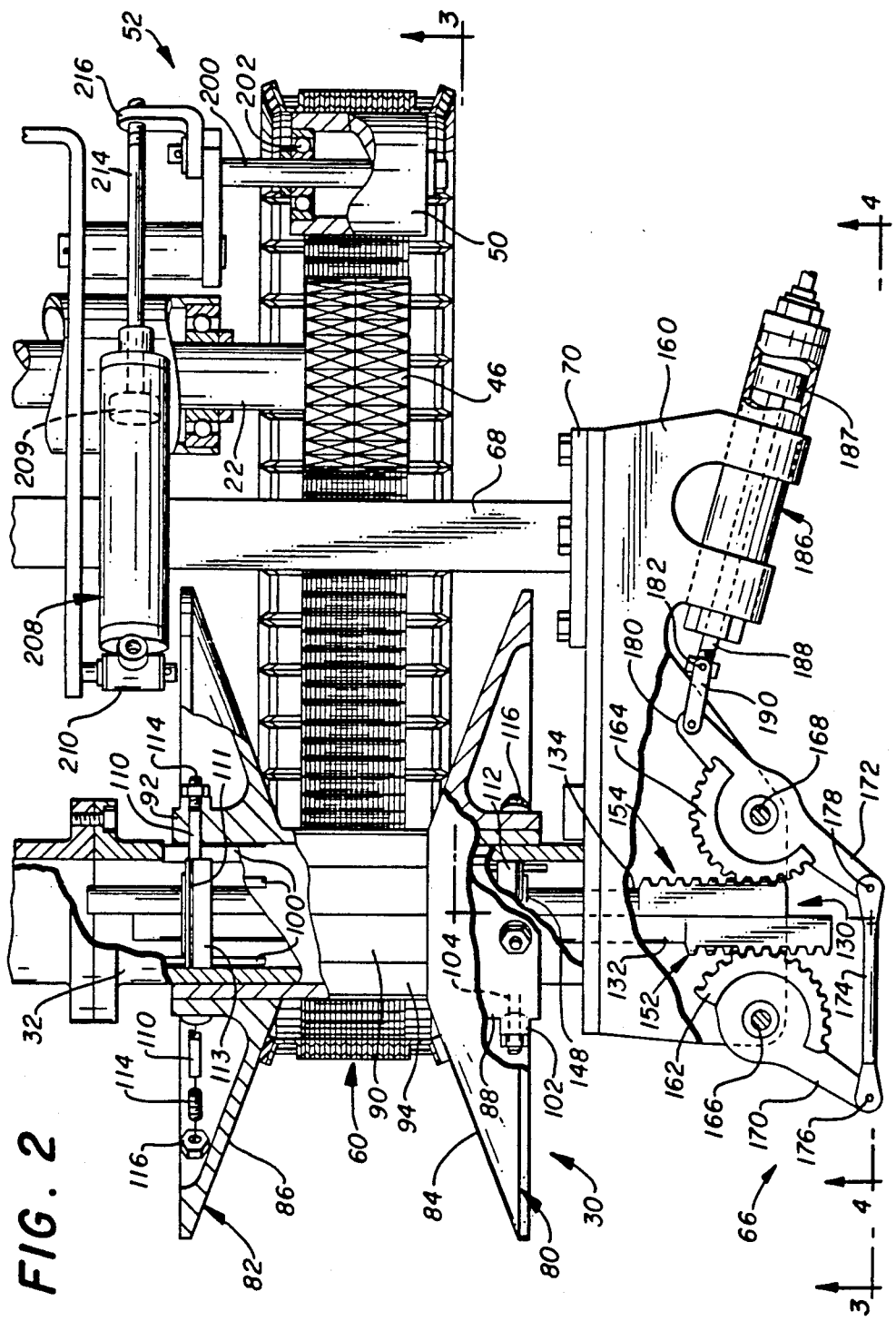
FIG. 2 is a partially broken away top view of the transmission of the present invention.

Transmission 20 is shown in greater detail in FIGS. 2, 3 and 4. Driven pulley assembly 30, shown exploded in FIG. 5, includes pulley halves 80 and 82, each having belt engaging inclined surfaces 84 and 86, respectively. Pulley half 80 has a hub 88 extending therefrom and interiorly extending splines 90. Similarly, pulley half 82 has a hub 92 extending therefrom and interiorly extending splines 94 which intermesh with splines 90 of pulley half 80. The splines of pulley halves 80 and 82 mesh one with the other to permit sliding relationship therebetween while assuring rotation of one pulley half with the other. Driven shaft 32 is received within splines 90 and 94 and supports pulley assembly 30 thereon. Driven shaft 32, shown in detail in FIG. 6, has a plurality of slots 100 formed therein along the longitudinal length thereof.

A plurality of bosses 102 are formed on hubs 88 and 92 of pulley halves 80 and 82 (FIGS. 2, 3 and 5). Radial slots 104 are formed within each boss 102 through hubs 88 and 92. Keys 110 are received within radial slots 104 and are aligned for engagement through slots 100 in driven shaft 32 thereby connecting the pulley halves slidably thereto. Keys 110 engage indentions 111 in an outer bearing races 112 and 113 (FIGS. 6 and 7) thereby positioning the race relative to pulley halves 80 and 82. Referring to FIG. 2, set screws 114 are received within upper threaded portions of slots 104 and bosses 102. A lock nut 116 is mounted on set screws 114 and advanced against bosses 102 to lock set screws 114 relative to hubs 88 and 92. It will be appreciated that pulley halves 80 and 82 are slidable relative to driven shaft 32 while being locked for rotation therewith by keys 110.

Referring to FIGS. 2, 3 and 4, pulley control mechanism 66 includes a split shaft asssembly 130 having a first half shaft 132 and a second opposite half shaft 134. As can been seen in FIGS. 8, 9 and 10, wherein split shaft assembly 130 is shown removed from pulley assembly 30, half shaft 132 has semicircular grooved slots 140 cut therein. Shaft half 134 has similar slots 142 cut therein. In their assembled position, illustrated in FIG. 8, shaft halves 132 and 134 receive thrust bearings 144 and 146 thereon. Bearings 144 and 146 are retained in position on half shafts 132 and 134 within thrust washers 148 and 150 which are mounted on opposite ends of shaft assembly 130 by engagement in slots 140 and 142, respectively. Thrust washer 148 prevents the outward movement of bearing 144 and thrust washer 150 prevents the outward movement of bearing 146. A rack 152 is attached on the end of shaft half 132, and a rack 154 is attached on the end of shaft half 134.

Referring now to FIGS. 2 and 4, pulley control mechanism 66 further includes a support frame 160 pivotally supporting control gears 162 and 164. Gears 162 and 164 mesh with racks 152 and 154, respectively, and rotate about pins 166 and 168. Gears 162 and 164 have arm extensions 170 and 172, respectively, extending therefrom. A connecting rod 174 joins the upper ends of arm extensions 170 and 172 by connection thereto through pins 176 and 178, causing gears 162 and 164 to move in unison.

Gear 164 has an arm extension 180 opposite extension 172. An actuation cylinder 186 is mounted from support 160 and has a piston 187 connecting piston rod 188 extending therefrom. The end of piston rod 188 is connected by an appropriate connection 190 to extension arm 180 through aperture 182. As can now be appreciated, by extending piston rod 188, control gears 162 and 164 are rotated. As viewed in FIG. 2, piston rod 188 is in a high gear position. Pressure applied to piston 187 extends piston rod 188, thus rotating the gear faces of gears 162 and 164 in opposite directions. As half shaft 132 moves inwardly, thrust washer 150 also moves inwardly and as half shaft 134 moves inwardly, thrust washer 148 attached thereto moves inwardly proportionally to the centerline of the pulley assembly. As a result, thrust washers 148 and 150 engage their respective bearings 144 and 146 which in turn engage outer bearing races 112 and 113 attached respectively to pulley halves 80 and 82. In this way, pulley halves 80 and 82 are drawn together as a result of the extension of piston rod 188 of actuation cylinder 186. Correspondingly, by the retraction of piston rod 188, pulley halves 80 and 82 are permitted to separate.

As is also shown in FIG. 2, support frame 160 is mounted relative to pulley assembly 30 from support 68 by support plate 70 also illustrated in FIG. 1.

As will now be appreciated, as the pulley halves 80 and 82 are drawn together, the effective diameter of the pulley is increased as a result of the constant width-chain belt assembly 60 being caused to ride higher on inclined surfaces 84 and 86 of pulley halves 80 and 82, respectively, resulting in the downshifting of the driven shaft to a lower gear ratio. Correspondingly, from low gear position, as the pulley halves are allowed to separate, the effective diameter of pulley assembly 30 is decreased as a result of chain-belt assembly 60 being permitted to ride lower on inclined surfaces 84 and 86 of pulley halves 80 and 82, respectively. Similarly, the longitudinal axis alignment of the belt is not altered as a result of the movement of the pulley halves 80 and 82 one from the other in that the pulley halves move simultaneously and in equal increments from a plane through the centerline of chain-belt assembly 60.

Referring now to FIGS. 2 and 3, idler pulley 50 is mounted for free rotation on bearings 202 on a shaft 200. Idler pulley 50 is supported on a tensioner arm 204 mounted for rotation on a shaft 206. The actuation mechanism 52 includes actuation cylinder 208 mounted between a fixed support 210 and an extension 216 connecting tensioner arm 204. Actuation cylinder 208, being controlled by piston 209, connects an extendable piston rod 214 having its end mounted to an extension 216 (FIG. 2) pivotally attached to tensioner arm 204 by an appropriate pin 218. By applying pressure to the actuation cylinder 208, tensioner arm 204 is moved outwardly, thereby removing any slack and producing constant tension on the chain-belt assembly 60 as necessary. As the pulley halves 80 and 82 separate to permit chain-belt assembly 60 to ride lower within pulley assembly 30, the extra slack in chain-belt assembly 60 is taken up by the idler pulley through the actuation mechanism 52. By applying a desired constant pressure to actuation cylinder 208, pressure may be communicated through actuation mechanism 52 and thus a constant tension may be maintained on chain-belt assembly 60.

Figure 11:
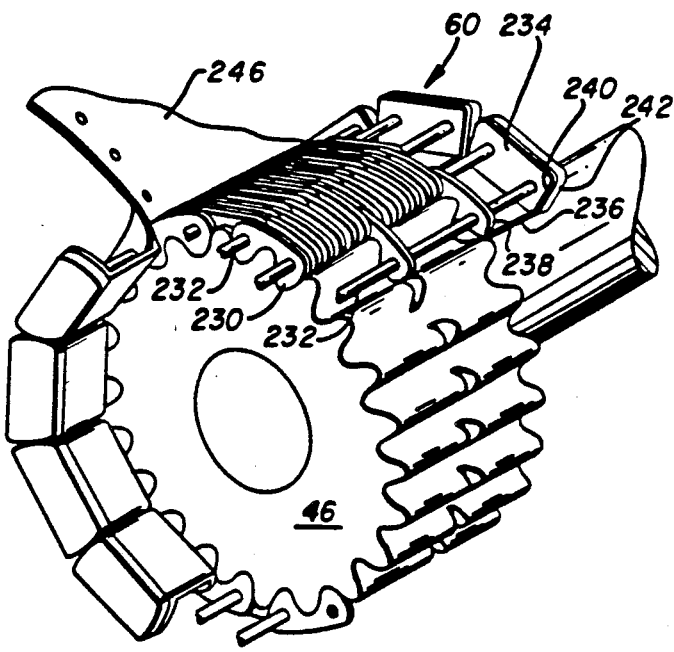
FIG. 11 is a perspective view showing the engagement of the chain-belt assembly to the drive sprocket in the transmission of the present invention with the cover of the chain assembly peeled back to better illustrate the structure of the chain assembly.

Referring now to FIGS. 11-13, chain-belt assembly 60 is a unique silent chain-belt arrangement permitting the transmission of power between toothed drive sprocket 46 and pulley assembly 30 having provisions for engagement by both. Chain-belt assembly 60 is composed of a plurality of tooth-like engaging chain links 230 joined by a plurality of pins 232. Pins 232 extend to both sides to teeth engaging chain links 230 and receive a plurality of substantially U-shaped belt links 234. Links 234 comprise a perpendicular base 236 with a upstanding arm extension 238 adjacent links 230. An inclined outstanding arm 240 extends from base 236 opposite arm 238 and angles outwardly, substantially corresponding to the inclined surface of surfaces 84 and 86 of pulley halves 80 and 82, respectively. A tractive pad 242 is attached to the outwardly facing surface of arm 240 and is made of suitable wear resistant material. Pads 242 engage inclined surfaces 84 and 86 of pulley halves 80 and 82, respectively, to transmit power from chain-belt assembly 60 to pulley assembly 30. A flexible cover 246, shown partially stripped back in FIGS. 11-13 for clarity, is mounted over links 230 and retained in place by engagement of pins 232 therethrough. Cover 246 serves to retain an appropriate lubricant adjacent links 230 as needed to provide lubrication to the intermediate portion of the belt which engages drive sprocket 46 and to provide protection to the same from contamination by foreign debris.

Thus, the present invention provides a chain-belt combination which has an intermediate section consisting of a modified silent type chain positively engaging a toothed sprocket rotatably driving therein while incorporating link sections forming the sides, adjacent to the intermediate portion of the chain-belt assembly. The belt links provide a positive engagement with the driven pulley assembly by the engagement of the belt links against the compatible inclined surface of the variable effective diameter pulley assembly. Thus, the efficient strength and rigid support of a chain is combined with the tractive grip of a belt.

Referring to FIGS. 2 and 3, the transmission of the present invention is shown in higher gear in that pulley halves 80 and 82 are separated to provide a smaller effectual diameter relative to the belt, thus decreasing the ratio between drive sprocket 46 and pulley assembly 30. When actuation cylinder 186 is activated to extend piston rod 188, control gears 162 and 164 are rotated to draw half shafts 132 and 134 inwardly, thereby causing the pulley halves 80 and 82 to be drawn together. Consequently, chain-belt assembly 60 is caused to move up inclined surfaces 84 and 86 to a relatively larger diameter, thereby increasing the drive ratio between drive shaft 22 and driven shaft 32. Low gear is achieved when pulley assembly 30 is in its closed position. This position is shown by phantom lines in FIG. 3. Actuation cylinder 186 may be controlled by various sources, such as manual control, hydraulically controlled, and/or electronic speed control sensors responsive to various power demands relative to appropriate gearing conditions. These methods of controlling actuation cylinder 186 are presented only as examples in that the control of cylinder 186 may be achieved by any number of possibilities, each of which is considered to be within the scope of the present invention.

Corresponding to the actuation of cylinder 186, idler pulley actuation mechanism operates to engage idler pulley 50 against chain-belt assembly 60 to maintain either a constant or a programmed variable tension on the belt as desired. Again, control of actuation cylinder 208 of the idler pulley actuation mechanism 52 may be in accordance with any number of parameters, one of which is to maintain a constant pressure thereon, thereby maintaining a substantially constant pneumatic tension on chain-belt assembly 60.

Therefore, the present invention provides a variable ratio transmission using a variable effective diameter pulley assembly driven by and coupled to a drive sprocket by unique chain belt structure. The pulley assembly includes two identical halves having inclined belt confronting surfaces and interlinked with splines which permit the pulley halves to move together or apart yet rotate as a unit. A unique chain-belt assembly transmits power between a drive sprocket and the pulley assembly and includes an outer portion having inclined surfaces for cooperating with the inclined surfaces of the pulley halves and an intermediate section for engaging the teeth of the drive sprocket.

The relative distance between the pulley halves is controlled by a shifting apparatus permitting the variation of the effective diameter of the pulley, thereby permitting the variation of the gear ratio between the drive sprocket and the driven pulley assembly. In low gear, the pulley halves are drawn together to effect a relatively large pulley diameter. Shifting to higher gearing is achieved in continuous increments, as needed, by permitting the pulley halves to move apart, thereby reducing the effective diameter of the driven pulley with which the belt assembly makes contact. The belt tension is maintained by an idler sprocket or pulley mounted on a pivoting arm, constantly pressured to eliminate any slack in the belt. In one embodiment, the arm is pivoted by a pressurized pneumatic cylinder. Alternatively, a spring actuated tensioner may be incorporated in the system, or both actuating means connected in unison.

Figure 14:
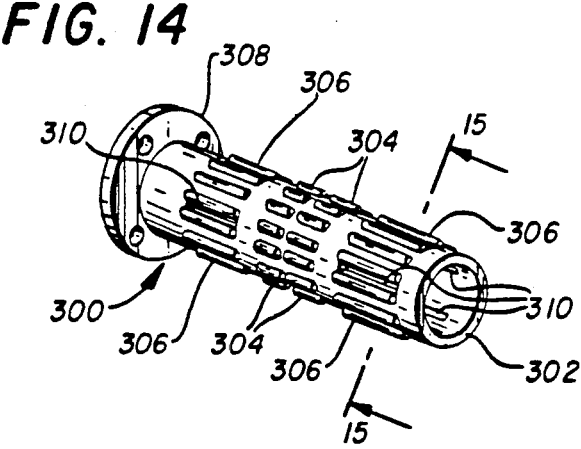
FIG. 14 is a perspective view of an alternative driven shaft used in the present invention.
Figure 15:
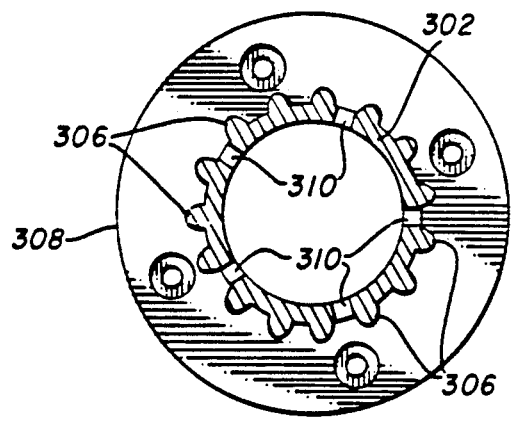
FIG. 15 is a section view taken along line 15—15 of FIG. 14.
Figure 16:
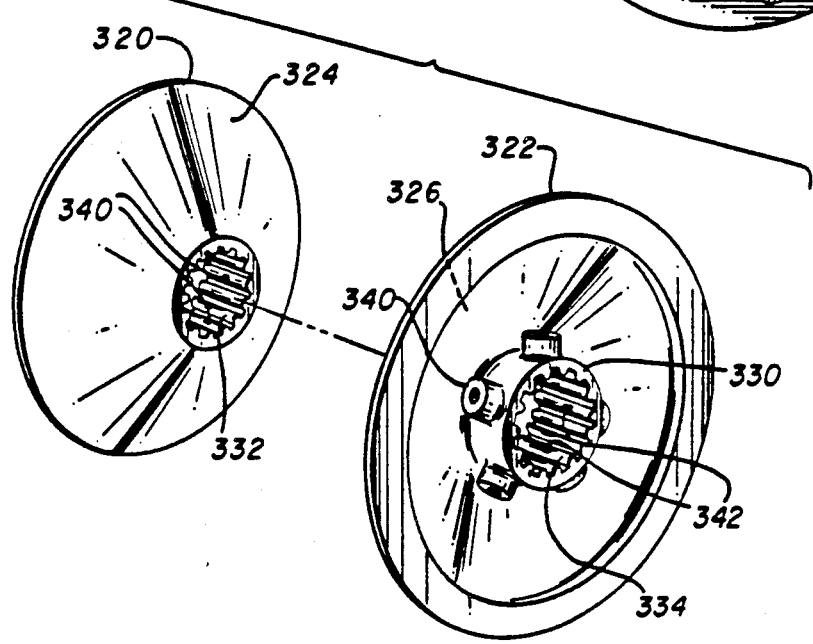
FIG. 16 is a perspective view of the variable effective diameter pulley halves used in an alternative embodiment of the present invention.

An alternative design for pulley halves 80 and 82 and hollow shaft 32 is illustrated in FIGS. 14, 15 and 16. Referring to these FIGURES, a hollow shaft 300 replaces shaft 32 illustrated in FIGS. 1,2, 3 and 6. Shaft 300 includes a main section 302 having a plurality of raised chain-belt assembly engaging sprocket teeth 304 in the central and exterior portions of the shaft corresponding to raised pulley engaging splines 306 on opposite sides of teeth 304. A flange 308 is secured to one end of the shaft for attachment to a differential, such as differential 24 shown in FIG. 1. A plurality of slots 310 are formed intermediate of certain of the splines 306 and correspond to slots 100 formed in hollow shaft 32 shown in FIG. 6.

Pulley halves 320 and 322 have an incline chain-belt assembly engaging surface 324 and 326, respectively. Each pulley half has a hub 330 having internal splines 332 and 334 for sliding engagement on splines 306 of shaft 300. As in pulley halves 80 and 82, a plurality of bosses 340 are formed on hub 330 and receive a key therein similar to pin 110 through slots 342 for engagement through slots 310 of shaft 300 for engagement in the outer races of bearings received within shaft 300 communicating with half shafts, such as half shafts 132 and 134 illustrated in the embodiment of FIGS. 2, 3, 8, 9 and 10.

The alternate embodiment of FIGS. 14-16 provides pulley halves which are more easily manufactured than those illustrated with respect to the first embodiment disclosed. Further, the embodiment also provides for a direct engagement between chain assembly 60 and shaft 300 in the higher gear position. Where pulley halves 320 and 322 are permitted to separate allowing the chain asssembly to move downwardly on the inclined surface to a lower effective diameter, the higher gear position is reached with the chain-belt assembly engaging the lowermost effective diameter of the pulley assembly. As the chain assembly moves to this lowermost position on the pulley assembly, teeth engaging chain links 230 will engage teeth 304 of shaft 300. This engagement effects a positive engagement between chain-belt assembly 60 and shaft 300. This positive engagement eliminates the possibility of slipage in the high gear position while permitting the variable ratio transmission 20 to operate as described with respect to the embodiment illustrated in FIGS. 1-13 in all other ratio positions.

This arrangement effectively reduces wear on the belt assembly in that in the high gear positions, the positive engagement between the belt assembly and the pulley assembly eliminates the traction between pads 242 and the inclined surfaces of the pulley halves.

In this embodiment, the rotation of pulley halves 320 and 322 is transmitted to shaft 300 by way of engagement between splines 306 of shaft 300 and splines 332 and 334 of the pulley halves. This arrangement provides an effective design for transmitting rotation forces between the pulley halves and the shaft while allowing sliding therebetween.

Thus, the present invention provides a transmission unit permitting the gradual transmission of mechanical energy from a drive shaft to a driven shaft with minimal power losses and having an absolute spectrum of ratios to maximize available power and minimize waste due to improper gearing. The present transmission provides more flexibility permitting utilization of available torque and reducing frictional losses resulting in power gains when compared to conventional transmission units. The present transmission will result in the relief of stresses on engines and drive parts, as well as the lowering of emission levels by permitting the engine to operate at a more constant operating speed. Pollutant emissions will also be lowered by the elimination of shift lag or abrupt gear changes associated with both standard and automatic transmissions presently in use.

The present transmission also provides a unit which is simplified in construction and requires only limited space requirements. The unit is readily adaptable because of the simplicity of the unit; thus, assembly and maintenance is reduced as well as lowered production costs.

The present transmission arrangement also incorporates one adjustable pulley assembly on the driven shaft, thereby providing more belt traction as the greatest area of effective pulley surface makes contact with the belt surface during low gear ratios where more demand is prevalent. This arrangement, under peak load conditions, provides inherent ease in shifting to higher ratios. Specifically, as the pulley halves are permitted to slide apart during ratio change, the belt moves inwardly to a smaller effective diameter within the variable pulley with little resistance. Under conditions of gear reduction to a lower gear ratio, the pulley halves are adjusted together to force the belt to larger circumference on the pulley's periphery. Wear is more prevalent when reducing to a lower ratio as the belt must be forced to a larger circumference; however, little load is applied during down shifting. Most load occurs during conditions of acceleration, that is, with shifting movement from a lower to a higher gear ratio.

The present invention also provides a novel belt arrangement which permits the connection of a drive sprocket mounted to the drive shaft with a variable diameter pulley mounted for rotation with a driven shaft. The silent-type chain-belt arrangement incorporated in the present invention provides links defining the edge thereof for engagement with the inclined wall surfaces of the variable pulley and toothed links intermediate of the edges of the belt for a positive engagement with the drive sprocket.

The present invention also provides a simplified means for controlling the effective diameter of the pulley by providing pulley halves which rotate as the control mechanism remains stationary. As has been described, the pulley halves are controlled by a split shaft with halves which operate in unison in opposite directions being controlled by a common mechanism. As a result, the pulley center line is aligned with the belt and sprocket throughout all transmission ratios assuring better traction and wear.

In the alternative embodiment illustrated in FIGS. 14-16, the present invention also provides for positive engagement between the chain-belt assembly and the hollow shaft in the high gear position. This arrangement eliminates slippage between the chain assembly and the variable pulley, as well as reduces wear on the chain-belt assembly.

Figure 17:
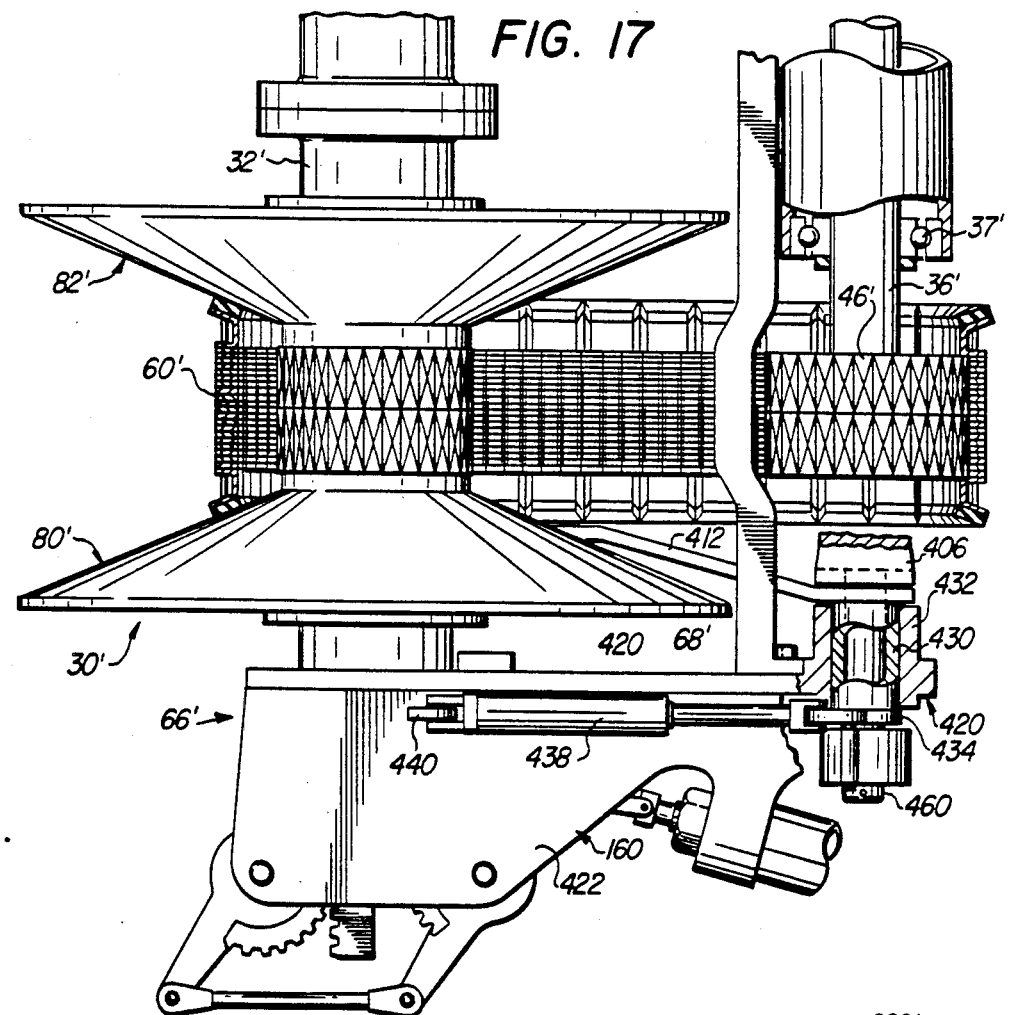
FIG. 17 is a partially broken away top view of the present invention having an alternative tensioner assembly for the chain-belt assembly.
Figure 18:
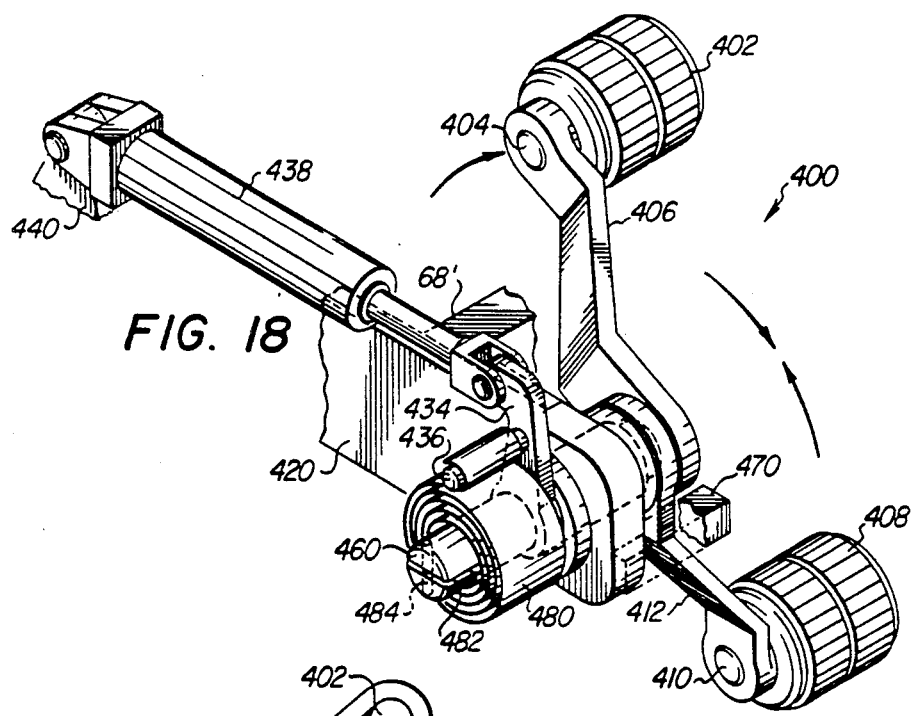
FIG. 18 is a perspective view of the alternative tensioner assembly.
Figure 19:
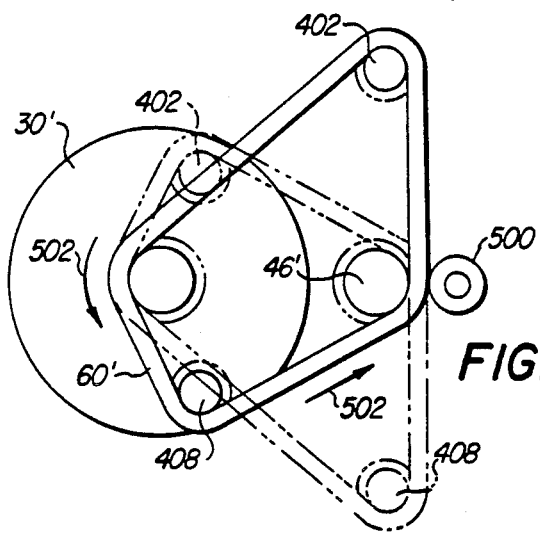
FIG. 19 is a schematic representation showing the varying positions of the tensioners and chain-belt assembly in their upshifting and downshifting directions as directional force is reversed.

In the alternative embodiment of FIGS. 17-19, a chain-belt idler pulley tensioner assembly 400 replaces the idler pulley 50 and the idler pulley actuation mechanism 52 shown in FIGS. 1 through 3. Referring specifically to FIG. 17, this alternative embodiment includes driven pulley assembly 30' with pulley halves 80' and 82'. Driven shaft 32' is received within splines defined in the hub of pulley halves 80' and 82', as described with respect to the embodiment illustrated in FIGS. 2 through 4. Pulley control mechanism 66' is identical to that described earlier with respect to the embodiment of FIGS. 2 through 4 and includes a support frame 160' having a base plate 420 with upstanding flanges 422. Control mechanism 66' is supported at one end by a support 68'. As is shown in FIG. 17, support 68' has a bend therein to provide clearance for drive sprocket 46'. As in the earlier embodiment, drive sprocket 46' is supported for rotation on a drive shaft 36' which is journaled in appropriate bearings 37'. As is also shown in FIG. 17, chain-belt assembly 60' is engaged around pulley assembly 30' and drive sprocket 46'. In addition, chain-belt assembly 60' is maintained in proper tension by tensioner system 400.

Referring to FIGS. 17 and 18, tensioner system 400 includes a first idler pulley sprocket or roller 402 supported for rotation on a shaft 404 mounted on the end of arm 406. Assembly 400 further includes a second idler pulley sprocket or roller 408 supported for rotation on a shaft 410 mounted on the end of arm 412. Both arms 406 and 412 are rotatably supported at their ends remote from the first and second idler pulleys, respectively, from base plate 420. Arms 406 and 412 rotate such that rollers 402 and 408 move in the plane of rotation of the chain-belt assembly. A bell crank 434 is attached to sleeve shaft 430 (FIG. 17) on the side of base plate 420 opposite arm 412. Bell crank 434 has a pin 436 extending tranversely therefrom and parallel to sleeve shaft 430. A damper assembly 438 is attached between bell crank 434 and an extended ear 440 from base plate 420 using appropriate fittings as shown in FIG. 18.

A shaft 460 extends transversely from arm 406 and is received within sleeve shaft 430 attached to arm 412. A stop plate 470 extending transversely from base plate 420, above arm 412 to limit upper rotation of arm 412 and arm 406.

A spring 480 is engaged between shaft 460 and pin 436. One end of spring 480 is engaged within slot 482 of shaft 460, and the opposite end formed with a loop, is engaged around pin 436. A pin 484 is inserted within an aperture in the end of shaft 460, transverse to slot 482 to prevent spring 480 from moving off the end of shaft 460.

FIG. 19 is a schematic representation showing the alternative positions that chain-belt assembly 60' will assume during upshifting and downshifting. The schematic also illustrates a tensioner roller or guardrail 500 (not shown in FIG. 18) which serves to maintain the belt in its appropriate entrainment engaged around drive sprocket 46'. In schematic 19, the chain-belt assembly 60' is shown in solid lines engaged around pulley assembly 30', idler pulley 408, drive sprocket 46' and idler roller 402. This position is illustrative of the position of the idler pulleys during high acceleration. As viewed in FIG. 19, rotation of chain-belt assembly 60' is in the direction of arrow 502.

As shown in phantom lines in FIG. 19, idler rollers 408 and 402 move to a different position under downshifting. However, in any operation of the variable ratio transmission of the present invention using the tensioner assembly 400, chain-belt assembly 60' is maintained taut.

Figure 21:
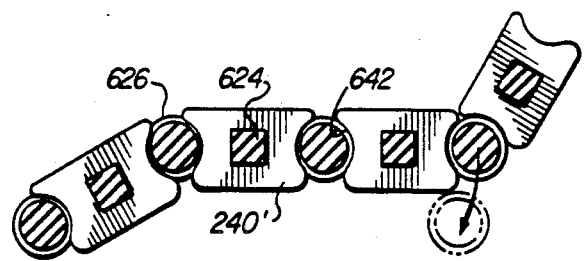
FIG. 21 is a section view of the chain-belt assembly shown in FIG. 20 but with the links flexed to show the method of attachment of the pulley engaging belting of the chain-belt assembly.
Figure 20:
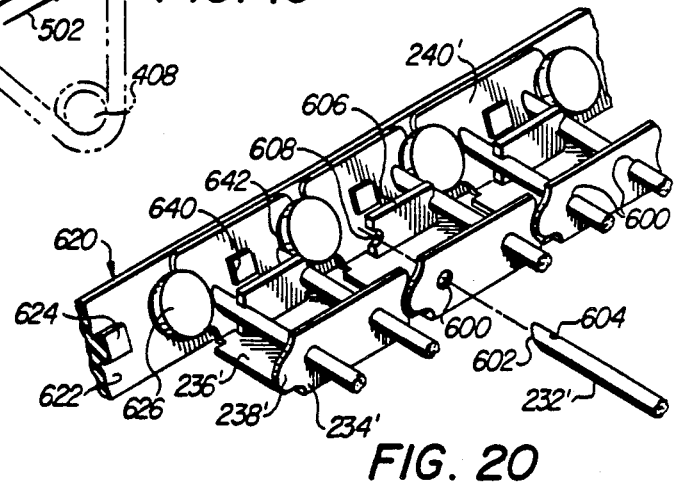
FIG. 20 is a perspective view showing an alternative structure for the chain-belt assembly exterior links.

Referring now to FIGS. 20 through 22, an alternative structure for the chain-belt assembly is shown. The alternative structure is directed to the U-shaped belt links 234 shown in the first embodiment in FIG. 11. In the embodiment of FIGS. 20 through 22, U-shaped links 234' include a base 236' with an upstanding arm extension 238' which serve to keep adjacent links in alignment. An inclined outstanding arm 240' extends from base 236' opposite arm 238'. Arm extension 238' has a pair of apertures 600 therein for receiving pins 232'. As is shown in FIG. 20, pins 232 are formed with a beveled end 602, having a bevel corresponding to the orientation of the inclined outstanding arm 240'.

Pins 232' further have a notch 604 formed therein. A retaining plate 606 is mounted to base 236' and extends upwardly therefrom parallel but removed from arm extension 238'. Retaining plate 606 has circular notches 608 formed in the ends thereof substantially aligned with aperture 600 in arm extensions 238' but with a spacing slightly greater than spacing between aperture 600. In one embodiment, spacing of notches 608 are approximately 0.1 cm greater than the spacing between aperture 600. As can be seen by structure illustrated in FIG. 20, U-shaped links 234'0 may be engaged on the ends of pins 232' by merely inserting the links thereon until notches 604 in pins 232' engage notches 608 of retaining plates 606. The beveled outer end 602 of pins 232' rest against and engage inclined upstanding arm 240'.

Figure 22A:
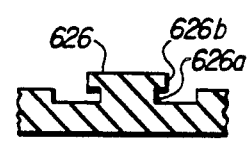
FIG. 22a and 22b are longitudinal section views of the pulley engaging belting showing alternative structure for attachment of the belting to the exterior links of the chain-belt assembly.
Figure 22B:

The alternative embodiment of FIGS. 20 through 22 also illustrate attachment of a continuous belting material to the chain-belt assembly. Particularly, the embodiment provides for a system which permits the attachment and removal of pulley engaging belting 620 when such is needed for repair or replacement. Belting 620 includes a strap 622 having spaced protrusions 624 and 626 extending from one face thereof. Protrusions 624 are square in dimension and protrusions 626 are circular. Referring to FIG. 22a, protrusions 626 are shown with a reduced diameter portion 626a and an enlarged end portion 626b. FIG. 22b shows an alternative arrangement for protrusion 626 wherein the protrusions are a separate piece from belting 622, having a larger root section 626c which is formed or otherwise attached within belting 620.

Referring to FIG. 20, arm 240' includes a cutout 640 substantially corresponding to the dimension of protrusion 624 of belting 620 and is designed for receiving protrusion 624 therein. The ends of arms 240' are also formed with an arcuate shaped end 642 for engagement around protrusion 626. By this structure, the edges of adjacent arms 240 interlock to maintain the links in alignment.

FIG. 21 illustrates the method of attachment of belting 620 to the chain-belt assembly. This is accomplished by flexing the belt inside out to rotate one link relative to the other to permit movement of protrusion 626 from therebetween. Such movement is accomplished after dislocating protrusion 624 from corresponding apertures 640 in arm 240'. With one link rotated upwardly, protrusion 624 and 626 may be dislodged from the belt links and pulled therefrom. With the belt in the assembled position and mounted for operation, belting 620 is prevented from moving off of links 234' by engagement of the protrusion 624 and 626 within and between upstanding arms 240' and by virtue of the circumferential dimension of belting 620 for an appropriate chain-link assembly which dimension resist any outward movement.

Although preferred embodiments of the invention have been described in the foregoing Detailed Description and illustrated in the accompanying Drawings, it will be understood that the invention is not limited to the embodiments disclosed but is capable of numerous rearrangements, modifications and substitutions of parts and elements without departing from the spirit of the invention. Accordingly, the present invention is intended to emcompass such rearrangements, modifications and substitutions of parts and elements as fall within the spirit and scope of the invention.

I claim:

1. In a variable speed transmission for transmitting rotational forces between a first shaft and a second shaft wherein a sprocket is mounted on the first shaft and a variable effective diameter pulley, having opposed inclined chain-belt engaging surfaces, is mounted on the second shaft, an endless chain-belt assembly for transmitting rotational forces, said assembly having side edges thereon, comprising:

a first portion defining the edges of said chain-belt assembly and having a plurality of links defining a surface corresponding to the opposed inclined chain-belt engaging surfaces on said pulley; and a second portion intermediate of the first portion having a plurality of links for engaging the teeth on said sprocket, said links being joined by a plurality of pins extending transverse to said links; and a flexible shield mounted over said links and retained relative thereto by said pins wherein said flexible shield surrounds the links of said second portion of said chain-belt assembly and retains lubrication for said second portion and to prevent same for communicating to the first portion of the chain-belt assembly.

2. In a variable speed transmission for transmitting rotational forces between a first shaft and a second shaft wherein a sprocket is mounted on the first shaft and a variable effective diameter pulley, having opposed inclined chain-belt engaging surfaces, is mounted on the second shaft, an endless chain-belt assembly having side edges thereon comprising:

a first portion defining the edges of said chain-belt assembly and having a plurality of fixed links defining a surface corresponding to the opposed inclined chain-belt engaging surfaces on said pulley said first portion including a plurality of U-shaped links having an outer leg inclined corresponding to the opposed inclined belt engaging faces of said pulley; and a wear resistant pad mounted on each said outer leg to cooperate with said opposed inclined belt engaging faces on said pulley to transmit power thereto; and a second portion intermediate of the first portion having a plurality of links for engaging the teeth on said sprocket.

3. An endless chain-belt assembly for driven engagement around a pulley or toothed sprocket comprising:

an intermediate portion comprising a plurality of center links for engaging the sprocket, the links being connected by transverse pins;

an edge portion defining the opposed edges of said chain-belt assembly and having a plurality of edge links defining a surface for engagement with surfaces of the pulley;

means for removably attaching said edge links to said intermediate portion; and means for releasably attaching a belting material to the edge links of said edge portion.

4. The chain-belt assembly according to claim 3 wherein said means for removably attaching said edge links to said intermediate portion comprises means for releaseably attaching said edge links to the transverse pins of said intermediate portion.

5. In a variable speed transmission for transmitting rotational forces between a first shaft and a second shaft wherein a sprocket is mounted on the first shaft and a variable effective diameter pulley, having opposed inclined chain-belt engaging surfaces, is mounted on the second shaft, an endless chain-belt assembly comprising:

a first portion defining the edges of said chain-belt assembly and a surface corresponding to the opposed inclined chain-belt engaging surfaces on said pulley;

means for releasably attaching a belting material to the surface of said first portion corresponding to the opposed inclined chain-belt engaging surfaces on said pulley; and a second portion intermediate of the first portion for engaging the teeth on said sprocket.

6. The chain-belt assembly according to claim 3 further comprising:

an endless belting material having protrusions therefrom, said protrusions having an enlarged head portion removed outwardly from said material; and said edge links having an end surface for engaging said protrusions between said head portion and said belting material to attached said belting material to said edge link.

7. The chain-belt assembly according to claim 3 wherein said edge links are U-shaped having a base, an outer arm extending from said base and an inner arm extending from said base, said inner arm having edges which pivotally interlock with the confronting edges of the inner arm of adjacent links.

8. An endless chain-belt assembly for driven engagement around a pulley and a toothed sprocket comprising:

an intermediate portion comprising a plurality of sprocket tooth engaging grooves; and an edges portion defining the opposed edges of said chain-belt assembly defining surfaces for engagement with surfaces of the pulley, said edges portion comprising a plurality of U-shaped links, each having an outer leg inclined corresponding to the surface of the pulley engaged by said inclined leg.

* * * * *